US011424571B2

(12) United States Patent
Dreilich et al.

(10) Patent No.: US 11,424,571 B2
(45) Date of Patent: Aug. 23, 2022

(54) COMPRESSOR/EXPANDER MACHINE

(71) Applicant: BITZER Kuehlmaschinenbau GmbH, Sindelfingen (DE)

(72) Inventors: Benjamin Dreilich, Halle (DE); Steffen Schramm, Leipzig (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 160 days.

(21) Appl. No.: 16/918,113

(22) Filed: Jul. 1, 2020

(65) Prior Publication Data

US 2021/0006004 A1 Jan. 7, 2021

(30) Foreign Application Priority Data

Jul. 4, 2019 (DE) .......................... 102019118138.0

(51) Int. Cl.
*H01R 13/52* (2006.01)
*F16L 5/10* (2006.01)

(52) U.S. Cl.
CPC .............. *H01R 13/521* (2013.01); *F16L 5/10* (2013.01)

(58) Field of Classification Search
CPC .... H01R 13/46; H01R 13/521; H01R 13/516; F16L 5/10; F16L 5/02
USPC ....................................................... 439/271
See application file for complete search history.

(56) References Cited

U.S. PATENT DOCUMENTS

| 5,126,608 | A | * | 6/1992 | Sogabe | H02K 5/225 310/71 |
| 5,199,898 | A | * | 4/1993 | Wisner | H01R 24/00 439/367 |
| 5,889,624 | A | * | 3/1999 | Dickenson | B60R 1/07 359/872 |
| 5,957,547 | A | * | 9/1999 | Schliebe | B60T 8/368 303/DIG. 10 |
| 6,811,426 | B2 | * | 11/2004 | Marioni | H02K 5/225 439/929 |

(Continued)

FOREIGN PATENT DOCUMENTS

| DE | 112013000628 T5 | 10/2017 |
| DE | 112013000628 T5 | 10/2018 |

(Continued)

*Primary Examiner* — Harshad C Patel
(74) *Attorney, Agent, or Firm* — Reinhart Boerner Van Deuren P.C.

(57) ABSTRACT

A compressor/expander machine is pressure-proof with an electrical connecting unit arranged on the housing thereof comprising at least one electrical lead-through that leads into an inner space for an electrical connection with an electrical unit arranged in the housing. The electrical lead-through comprises a mounting body that is mounted on the housing as a separate element and electrical contact elements seated therein. The mounting body comprises a first mounting body sealing surface which is remote from the at least one inner space and surrounds the electrical contact elements in closed manner and which runs transverse to a compressive force that acts on the lead-through due to the medium under pressure in the at least one inner space and which cooperates in sealing manner with a first housing sealing surface of the housing that faces the at least one inner space and this first mounting body sealing surface.

28 Claims, 4 Drawing Sheets

(56) References Cited

U.S. PATENT DOCUMENTS

| | | | |
|---|---|---|---|
| 7,056,104 B2* | 6/2006 | Kimura | F04C 18/0215 |
| | | | 310/85 |
| 7,178,976 B2* | 2/2007 | Gerber | B01F 27/2122 |
| | | | 366/181.4 |
| 11,031,722 B2* | 6/2021 | Gong | H01R 13/50 |
| 2002/0043883 A1* | 4/2002 | Shimizu | H01R 13/405 |
| | | | 310/71 |
| 2010/0247346 A1* | 9/2010 | Hasegawa | F04C 23/008 |
| | | | 439/271 |
| 2014/0199870 A1* | 7/2014 | Tamaki | H01R 13/658 |
| | | | 439/271 |
| 2014/0373454 A1* | 12/2014 | Sasaki | E05F 15/63 |
| | | | 49/350 |
| 2014/0375157 A1 | 12/2014 | Taguchi et al. | |
| 2019/0052070 A1 | 2/2019 | Hattori et al. | |

FOREIGN PATENT DOCUMENTS

| | | |
|---|---|---|
| DE | 112017003154 T5 | 3/2019 |
| EP | 1970568 A1 | 9/2008 |
| EP | 2894333 A1 | 7/2015 |
| EP | 2894333 B1 | 7/2015 |
| KR | 20160055638 A | 5/2016 |

\* cited by examiner

COMPRESSOR/EXPANDER MACHINE

CROSS-REFERENCE TO RELATED PATENT APPLICATION

This patent application claims the benefit of German application No. 10 2019 118 138.0, filed Jul. 4, 2019, the teachings and disclosure of which are hereby incorporated in their entirety by reference thereto.

BACKGROUND OF THE INVENTION

The invention relates to a compressor/expander machine having a housing in which there is arranged a compressor/expander unit for a medium that is guided in at least one inner space of the housing, and having an electrical connecting unit that is arranged on the housing comprising at least one electrical lead-through that is arranged on the housing and leads into the at least one inner space for establishing an electrical connection to an electrical unit that is arranged in the housing.

Compressor/expander machines of this type are known. In these, the electrical lead-through is welded to the housing in order to achieve the requisite seal.

Consequently, the object of the invention is to find a simpler solution.

In accordance with the invention, this object is achieved in the case of a compressor/expander machine of the type described hereinabove in that the electrical lead-through comprises a mounting body that is mounted on the housing as a separate element as well as electrical contact elements that are seated therein, in that the mounting body comprises a first mounting body sealing surface which is remote from the at least one inner space and surrounds the electrical contact elements in closed manner and which runs transverse to a compressive force that acts on the lead-through due to the medium under pressure in the at least one inner space and which cooperates in sealing manner with a first housing sealing surface of the housing that faces the at least one inner space as well as this first mounting body sealing surface, and in that the mounting body is fixed to the housing by at least one holding element which holds the mounting body in such a way that the first mounting body sealing surface is located in a sealing disposition relative to the first housing sealing surface.

SUMMARY OF THE INVENTION

The advantage of the solution in accordance with the invention is to be seen in that the possibility then exists of realizing a reliable seal between the mounting body and the housing when employing a mounting body that is mounted on the housing as a separate element by utilization of the compressive force in the inner space whereby, due to the path of the first mounting body sealing surface transverse to the compressive force, i.e. inclined or perpendicular to the compressive force, the compressive force can be utilised for the sealing process.

It is particularly advantageous thereby if the at least one holding element permits a movement of the first mounting body sealing surface in the direction of the first housing sealing surface.

It is thereby possible to enable the compressive force acting on the electrical lead-through due to the medium under pressure in the inner space to be utilised in order to realize the seal between the mounting body sealing surface and the housing sealing surface in an optimal manner.

It is particularly advantageous constructionally, if the mounting body sealing surface is arranged on a flange body of the mounting body surrounding the electrical contact elements and thus surrounds the mounting body.

Furthermore, it is advantageous if a first sealing element is arranged and in particular clamped between the first mounting body sealing surface and the first housing sealing surface in order to ensure the optimal seal between the mounting body sealing surface and the housing sealing surface.

In particular hereby, provision is made for both the first mounting body sealing surface and the first housing sealing surface to each abut on the first sealing element in sealing manner, which is particularly the case when, under the effect of the compressive force acting on the lead-through, the mounting body sealing surface of the mounting body exerts force on the sealing element, and, for its part, the latter is in turn thereby held forcefully on the first housing sealing surface.

A further improved embodiment envisages that the mounting body comprise a second mounting body sealing surface which surrounds the whole of the electrical contact elements in closed manner and runs transversely, i.e. inclined or perpendicularly with respect to the first mounting body sealing surface and that the housing comprise a second housing sealing surface which runs transversely, i.e. inclined or perpendicularly with respect to the first housing sealing surface and cooperates with the second mounting body sealing surface in sealing manner.

A second mounting body sealing surface of this type cooperating with a second housing sealing surface creates the possibility of creating a further sealing location in addition to the first mounting body sealing surface and to the first housing sealing surface.

This is particularly advantageous when the second mounting body sealing surface and the second housing sealing surface are arranged in cooperating manner on a side of the first mounting body sealing surface and the first housing sealing surface which faces the at least one inner space so that, in particular in the case of no or a low absolute pressure of the medium in the inner space, a sealing effect initially occurs by means of the second mounting body sealing surface and the second housing sealing surface which permits a pressure to build-up that then advantageously acts thereafter on the seal between the first mounting body sealing surface and the first housing sealing surface.

It is particularly expedient thereby if the second mounting body sealing surface and the second housing sealing surface are oriented in such a way that the first mounting body sealing surface of the mounting body is movable in the direction of the first housing sealing surface, in particular, with impingement of the first sealing element so that the utilization of the compressive force for the creation of an optimal seal between the first mounting body sealing surface and the first housing sealing surface is not impaired by the second mounting body sealing surface and the second housing sealing surface.

To this end, provision is preferably made for the first mounting body sealing surface and the second mounting body sealing surface to run approximately transversely, preferably perpendicularly with respect to one another so that the seal between the second mounting body sealing surface and the second housing sealing surface is independent of the movability of the mounting body for the purposes of forming an optimal seal between the first mounting body sealing surface and the first housing sealing surface.

In order to also optimize the seal between the second mounting body sealing surface and the second housing sealing surface, provision is preferably made for a second sealing element, in particular a sealing ring to be provided therebetween, which said second sealing element contributes to the sealing effect between the second mounting body sealing surface and the second housing sealing surface.

Furthermore, provision is preferably made for the second mounting body sealing surface and the second housing sealing surface possibly in co-operation with the second sealing element to cooperate in such a manner that guidance of the mounting body takes place in a guidance direction which runs transversely, preferably perpendicularly with respect to the first mounting body sealing surface and the first housing sealing surface.

In particular, provision is made in this case for the second mounting body sealing surface and the second housing sealing surface to run parallel to each other.

In order to enable the electrical lead-through to be positioned as exactly as possible relative to the housing, provision is preferably made for the mounting body to be provided with a first receiving surface which cooperates with a second receiving surface arranged on the housing.

Hereby, the first receiving surface and the second receiving surface serve for the purposes of achieving as exact a positioning of the mounting body relative to the first mounting body sealing surface and the first housing sealing surface as possible.

In particular, the first receiving surface and the second receiving surface are formed in such a way as to also prevent twisting of the electrical lead-through relative to the housing in order to thereby fix the electrical lead-through to the housing in mutually non-twistable manner.

Likewise, in order not to hinder the sealing effect between the first mounting body sealing surface and the first housing sealing surface, provision is preferably made for the first receiving surface and the second receiving surface to run in such a way that the first mounting body sealing surface of the mounting body is movable in the direction of the first housing sealing surface, in particular, with impingement of the first sealing element.

In this case, guidance of the mounting body relative to the housing in a guidance direction can also be achieved by the first receiving surface and the second receiving surface as an alternative and/or in addition to the effect of the second mounting body sealing surface and the second housing sealing surface.

In particular hereby, provision is made for the first and the second receiving surface to run transverse to the first mounting body sealing surface and transverse to the first housing sealing surface, preferably perpendicularly thereto.

Moreover, provision is made for the first receiving surface and the second receiving surface to form a positively-locking arrangement which fixes the electrical lead-through relative to the housing in mutually non-rotatable manner, preferably fixed in a single rotary position relative to the housing in mutually non-rotatable manner.

It is particularly expedient furthermore, if the first receiving surface and the second receiving surface are arranged on a side of the first mounting body sealing surface and the first housing sealing surface that is remote from the at least one inner space so that they have no effect whatsoever in connection with the seal between the housing and the mounting body.

Until now, no particular details have been given in regard to the arrangement of the electrical lead-through on the housing.

Thus in principle, the electrical lead-through could be arranged at any position of the housing but preferably however, on a housing section provided for the accommodation of the electrical machine.

It is particularly expedient if the electrical lead-through is arranged on an element thereof that is mountable on the housing, in particular on an element of the housing that is mountable after installation of the electrical machine so that wiring-up of the electrical lead-through is possible after installation of the electrical machine which can thereby be effected more easily and more securely.

One advantageous solution envisages that the electrical lead-through be arranged on a mountable element of the housing, for example, a cover of the housing, in particular on an element provided on the housing opposite the compressor/expansion unit.

Hereby, the element is preferably provided on the housing section accommodating the electrical machine.

No particular details have been given in regard to the construction of the electrical connecting unit in connection with the previous description of the individual solutions.

One particularly advantageous solution envisages that the electrical connecting unit comprise a plug connector that is connectable or connected to the electrical lead-through.

A plug connector of this type permits a releasable connection to the electrical lead-through to be established in a particularly simple way.

In particular hereby, provision is preferably made for the plug connector to comprise plug connector elements that are connectable to the contact elements of the electrical lead-through.

Furthermore, provision is preferably made for the plug connector to comprise an earthing plug connector element which is connectable or connected to an earthing contact element on the housing-side.

An earthing plug connector element of this type in combination with a housing-side earthing contact element creates the possibility of establishing an earthing contact between the housing of the compressor/expander machine in a simpler way.

In principle, the housing-side earthing contact element could be implemented as a contact element of the electrical lead-through and could thereby establish a connection between the housing and the earthing contact element in the inner space of the housing for example.

A particularly simple and advantageous solution envisages that the housing-side earthing contact element be arranged on the housing near the electrical lead-through so that the contact element can be realized directly in an electrically conducting connection to the housing without making it necessary to have a contact element of the electrical lead-through for this purpose.

In particular in this case, the housing-side earthing contact element can then serve, when it is connected to the appropriate earthing plug connector element, for the purpose of prescribing a unique orientation of the plug connector relative to the electrical lead-through and thus for example, prevent incorrect contacting of the electrical lead-through.

Furthermore, one advantageous solution envisages that the plug connector comprise a plug connector housing which is connectable or connected to the housing in order to thereby additionally define and permanently position the plug connector itself relative to the housing.

In particular hereby, provision is made for a seal to be provided between the plug connector housing and the housing which will permit a space of the plug connector housing accommodating the plug connector elements to be protected from external influences, in particular humidity.

Furthermore, provision is preferably made for the plug connector housing to comprise at least one first positively-locking surface which cooperates with a second positively-locking surface arranged on the housing for the purposes of positioning the plug connector housing relative to the housing.

It is particularly expedient hereby, if the first positively-locking surface and the second positively-locking surface create a mutually non-twistable positively-locking connection.

Up to now, no particular details have been given in regard to the drive of the compressor/expander unit.

For example, the electrical machine could be arranged outside of the housing.

Thus, one advantageous solution envisages that an electrical machine that is mechanically coupled to the compressor/expander unit be arranged in the housing as an electrical unit.

Furthermore, provision is preferably made for at least one electrical sensor to be arranged in the housing as an electrical unit.

The preceding description of solutions in accordance with the invention thus embraces in particular the different combinations of features defined by the following consecutively numbered embodiments:

1. Compressor/expander machine having a housing (12) in which there is arranged a compressor/expander unit (14) for a medium that is guided in at least one inner space (22, 86) of the housing (12), and having an electrical connecting unit (100) that is arranged on the housing (12), comprising at least one electrical lead-through (90) that is arranged on the housing (12) and leads into at least one inner space (22, 86) for the establishment of an electrical connection to at least one electrical unit (74, 96) that is arranged in the housing (12), wherein the electrical lead-through (90) comprises a mounting body (102) that is mounted on the housing (12) as a separate element as well as electrical contact elements (106) that are seated therein, in that the mounting body (102) comprises a first mounting body sealing surface (112) which is remote from the at least one inner space (22, 86) and surrounds the electrical contact elements (106) in closed manner and which runs transverse to a compressive force (D) that acts on the lead-through (90) due to the medium under pressure in the at least one inner space (22, 86) and which cooperates in sealing manner with a first housing sealing surface (114) of the housing (12) that faces the at least one inner space (22, 86) as well as this first mounting body sealing surface (112), and in that the mounting body (102) is fixed to the housing (12) by at least one holding element (124) which holds the mounting body (102) in such a way that the first mounting body sealing surface (112) is located in a sealing disposition relative to the first housing sealing surface (114).

2. A compressor/expander machine in accordance with embodiment 1, wherein the at least one holding element (124) permits a movement of the first mounting body sealing surface (112) in the direction of the first housing sealing surface (114).

3. A compressor/expander machine in accordance with embodiment 1 or 2, wherein the first mounting body sealing surface (112) is arranged on a flange body (110) of the mounting body (102) surrounding the electrical contact elements (106).

4. A compressor/expander machine in accordance with any of the preceding embodiments, wherein a first sealing element (122) is arranged, in particular clamped, between the first mounting body sealing surface (112) and the first housing sealing surface (114).

5. A compressor/expander machine in accordance with embodiment 4, wherein both the first mounting body sealing surface (112) and the first housing sealing surface (114) each abut on the first sealing element (122) in sealing manner.

6. A compressor/expander machine in accordance with any of the preceding embodiments, wherein the mounting body (102) comprises a second mounting body sealing surface (132) which surrounds the whole of the electrical contact elements (106) in closed manner and runs transverse to the first mounting body sealing surface (112), and in that the housing (12) comprises a second housing sealing surface (134) which runs transverse to the first housing sealing surface (114) and cooperates with the second mounting body sealing surface (132) in sealing manner.

7. A compressor/expander machine in accordance with embodiment 6, wherein the second mounting body sealing surface (132) and the second housing sealing surface (134) are arranged in cooperating manner on a side of the first mounting body sealing surface (112) and the first housing sealing surface (114) that faces the at least one inner space (22, 86).

8. A compressor/expander machine in accordance with embodiment 6 or 7, wherein the second mounting body sealing surface (132) and the second housing sealing surface (134) are oriented in such a way that the first mounting body sealing surface (112) of the mounting body (102) is movable in the direction of the first housing sealing surface (114), in particular, with impingement of the first sealing element (122).

9. A compressor/expander machine in accordance with any of the embodiments 6 to 8, wherein the first mounting body sealing surface (112) and the second mounting body sealing surface (132) run approximately transversely, preferably perpendicularly, relative to each other.

10. A compressor/expander machine in accordance with any of the embodiments 6 to 9, wherein a second sealing element (136), in particular a sealing ring is arranged between the second mounting body sealing surface (132) and the second housing sealing surface (134).

11. A compressor/expander machine in accordance with any of the preceding embodiments, wherein the mounting body (102) is provided with a first receiving surface (152) which cooperates with a second receiving surface (154) that is arranged on the housing (12).

12. A compressor/expander machine in accordance with embodiment 11, wherein the first receiving surface (152) and the second receiving surface (154) run in such a way that the first mounting body sealing surface (112) of the mounting body (102) is movable in the direction of the first housing sealing surface (114), in particular with impingement of the first sealing element (122).

13. A compressor/expander machine in accordance with embodiment 11 or 12, wherein the first and the second receiving surface (152, 154) run transverse to the first mounting body sealing surface (112) and transverse to the first housing sealing surface (114).

14. A compressor/expander machine in accordance with any of the embodiments 11 to 13, wherein the first receiving surface (152) and the second receiving surface (154) form a positively-locking arrangement which fixes the electrical lead-through (90) relative to the housing (12) in mutually non-rotatable manner.

15. A compressor/expander machine in accordance with any of the embodiments 11 to 14, wherein the first receiving surface (152) and the second receiving surface (154) are arranged on a side of the first mounting body sealing surface (112) and the first housing sealing surface (114) that is remote from the at least one inner space (82, 86).

16. A compressor/expander machine in accordance with any of the preceding embodiments, wherein the electrical lead-through is arranged on an element of the housing that is mountable on the housing, in particular, on an element of the housing that is mountable after the electrical machine.

17. A compressor/expander machine in accordance with any of the preceding embodiments, wherein the electrical lead-through (90) is arranged on an element (162) of the housing (12), in particular, on an element that is provided on the housing (12) opposite the compressor/expander unit.

18. A compressor/expander machine in accordance with embodiment 17, wherein the mountable element (162) is arranged on a housing section (72) accommodating the electrical machine (74).

19. A compressor/expander machine in accordance with any of the preceding embodiments, wherein the electrical connecting unit (100) comprises a plug connector (170) that is connectable or connected to the electrical lead-through (90).

20. A compressor/expander machine in accordance with embodiment 19, wherein that the plug connector (170) comprises plug connector elements (172) that are connectable to the contact elements (106) of the electrical lead-through (90).

21. A compressor/expander machine in accordance with embodiment 19 or 20, wherein the plug connector (170) comprises an earthing plug connector element (194) which is connectable or connected to a housing-side earthing contact element (192).

22. A compressor/expander machine in accordance with embodiment 21, wherein the housing-side earthing contact element (192) is arranged on the housing (12) near the electrical lead-through (90).

23. A compressor/expander machine in accordance with any of the embodiments 19 to 22, wherein the plug connector (170) comprises a plug connector housing (174) which is connectable or connected to the housing (12).

24. A compressor/expander machine in accordance with embodiment 23, wherein a seal (184) is provided between the plug connector housing (174) and the housing (12).

25. A compressor/expander machine in accordance with embodiment 23 or 24, wherein the plug connector housing (174) comprises at least one first positively-locking surface (202) which cooperates with a second positively-locking surface (214) arranged on the housing for the purposes of positioning the plug connector housing (174) relative to the housing (12).

26. A compressor/expander machine in accordance with embodiment 25, wherein the first positively-locking surface (202) and the second positively-locking surface (214) create a mutually non-twistable is positively-locking connection.

27. A compressor/expander machine in accordance with any of the preceding embodiments, wherein an electrical machine (74) in the form of an electrical unit that is mechanically coupled to the compressor expander unit (14) is arranged in the housing (12).

28. A compressor/expander machine in accordance with any of the preceding embodiments, wherein at least one electrical sensor (96) in the form of an electrical unit is arranged in the housing (12).

Further features and advantages of the invention form the subject matter of the following description as well as the graphical illustration of some exemplary embodiments.

DETAILED DESCRIPTION OF THE INVENTION

Figure 1:
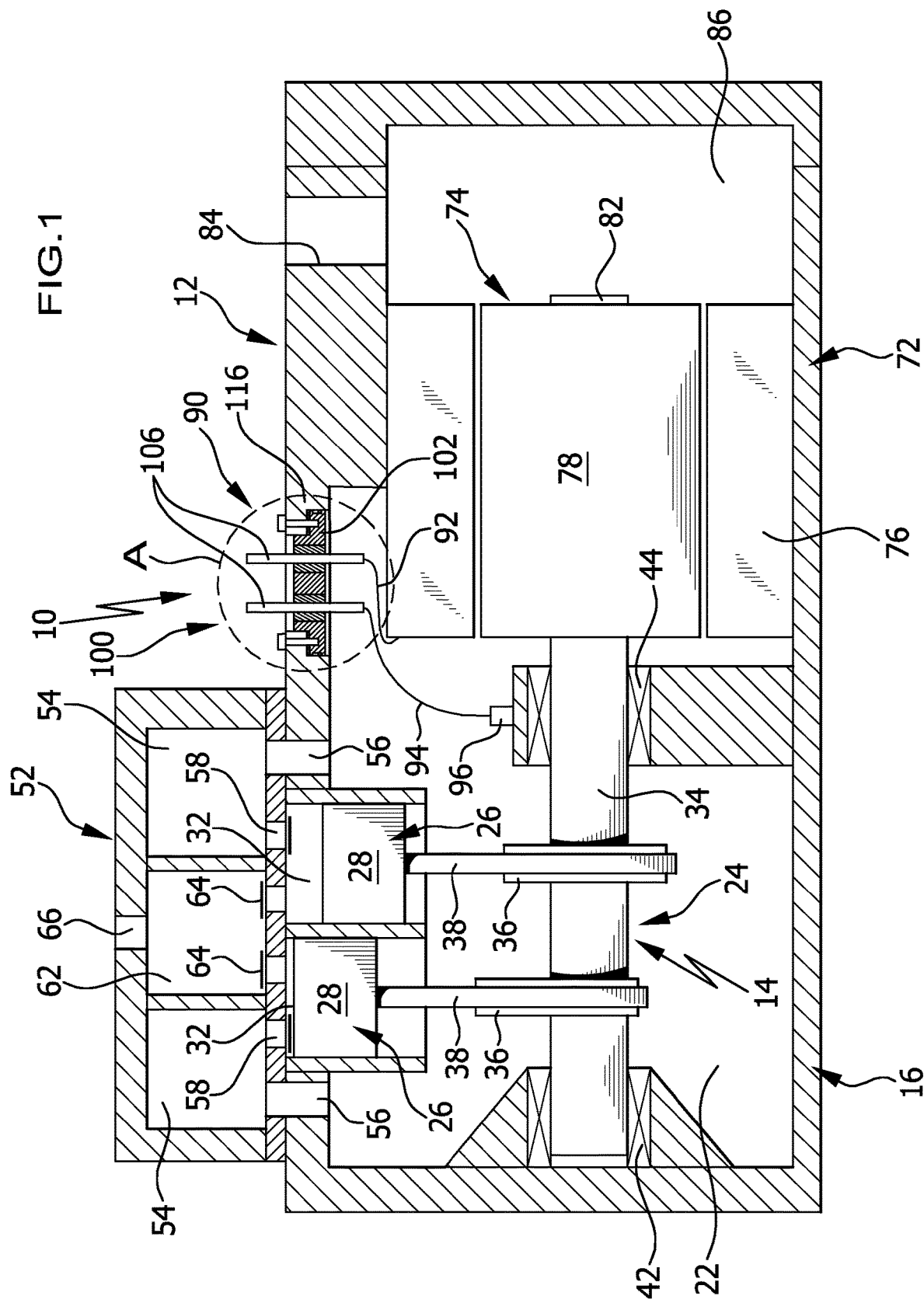
FIG. 1 shows a longitudinal section through a first exemplary embodiment of a compressor/expander machine in accordance with the invention.
Figure 2:
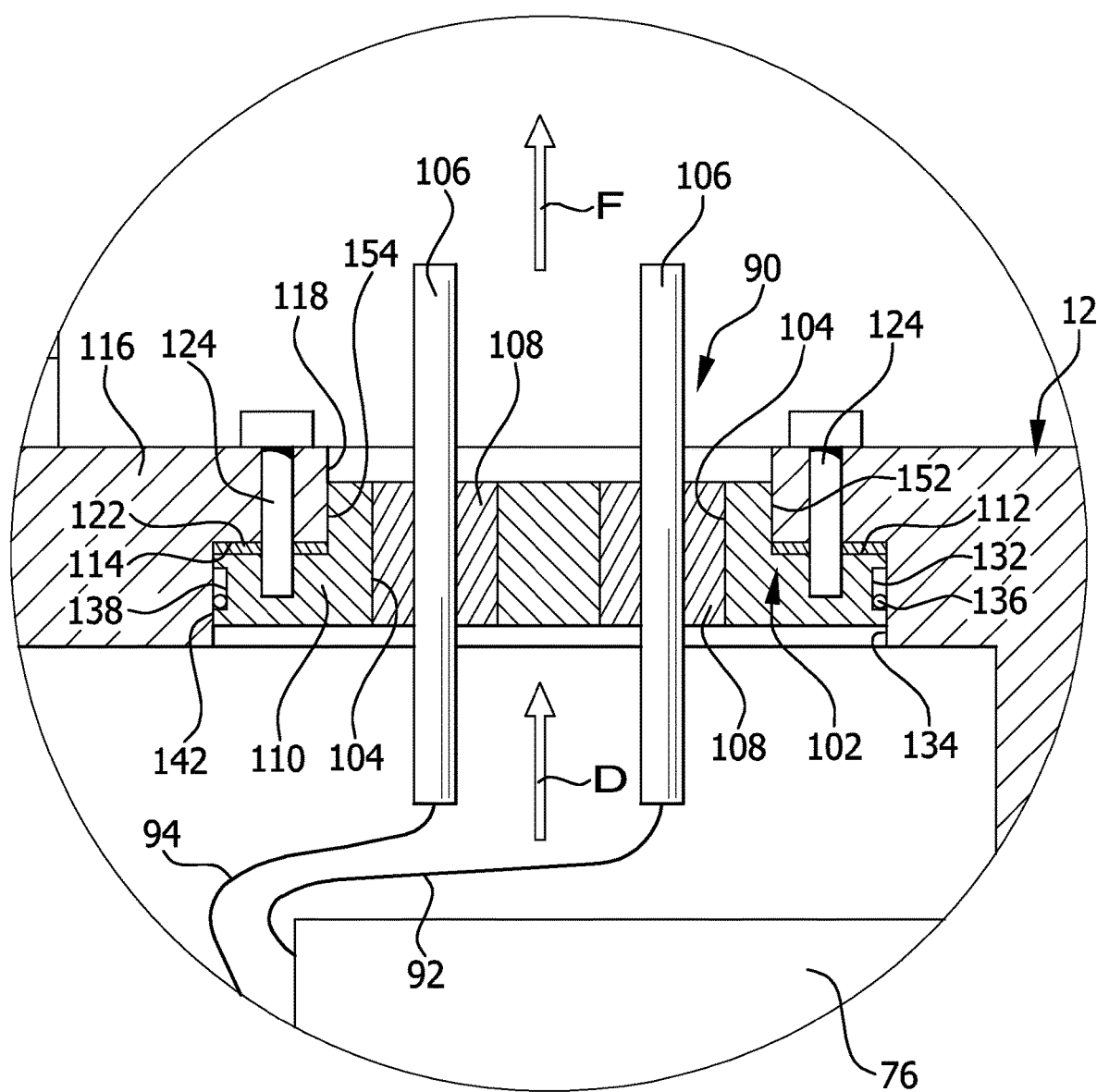
FIG. 2 an enlarged illustration of the region A in FIG. 1.

A first exemplary embodiment of a compressor/expander machine 10 that is illustrated in FIGS. 1 and 2 comprises a housing 12 in which there is arranged a compressor/expander unit 14 that is exemplarily in the form of a piston machine in the first exemplary embodiment and is arranged in a housing section 16 of the housing 12.

Hereby, the housing section 16 encloses an inner space 22 in which there is arranged a piston drive 24 of the compressor/expander unit 14 that is coupled to pistons 28 that are movable in reciprocating manner in cylinders 26 so that a medium arranged in cylinder chambers 32 of the individual cylinders 26 can either be compressed or expanded, whereby either the pistons 28 are driven by the piston drive 24 for compressing the medium or the pistons 28 drive the piston drive 24 when the medium is expanding.

The piston drive 24 comprises for example an eccentric shaft 34 having eccentric cams 36 arranged thereon, which are coupled by piston rods 38 to the respective pistons 28. Furthermore, the eccentric shaft 34 is mounted in the housing section 16 in rotary manner via bearings 42, 44.

For the purposes of closing the cylinders 26, the housing section 16 also comprises an associated cylinder head 52 in which there are provided inlet chambers 54 into which the medium being supplied to the compressor/expander unit 14 enters via inlet channels 56 leading from the inner space 22 into the inlet chambers 54 and from which the medium enters the cylinder chambers 32 via inlet valves 58.

Furthermore for example, there is provided at least one outlet chamber 62 in the cylinder head 52 into which the medium leaving the cylinder chambers 32 enters via outlet valves 64 and which the medium leaves via an outlet channel 66.

Furthermore, the housing 12 comprises a housing section 72 in which there is arranged an electrical machine that is designated as a whole by 74 and which comprises a stator 76 and a rotor 78, wherein the rotor 78 is located on a shaft section 82 of the eccentric shaft and is thus coupled to the piston drive 24, in particular, in a mechanically rigid manner.

In the first exemplary embodiment of the compressor/expander machine in accordance with the invention, the housing section 72 is provided with an inlet opening 84 for the entering medium which is arranged on a side of the electrical machine 74 in the housing section 72 that is remote from the piston drive 24 so that the medium entering through the inlet opening 84 enters an inner space 86 of the housing section 72 accommodating the electrical machine 74, then flows around and cools the stator 76 and the rotor 78 and then enters the inner space 22 and from there enters the inlet chambers 54 through the inlet channels 56.

Thus, both the inner space 86 having the electrical machine 74 and the inner space 22 for accommodating the piston drive 24 are subjected to the pressure of the medium which is flowing into the compressor/expander unit 14.

In the case where the compressor/expander unit 14 is operated as a compressor unit, in particular, with CO2 as the working medium, the inner spaces 86 and 22 are under high pressure, for example, at an absolute pressure of approximately 10 bar—in particular, when at a standstill—and up to 120 bar—for example, in operation —.

In the case of operation of the compressor/expander unit 14 as an expander unit, the inner spaces 86 and 22 are at a comparable absolute pressure of the working medium.

Furthermore, the housing is provided with an electrical lead-through 90 which serves on the one hand for feeding out of the housing 12 electrical terminal lines 92 of the electrical machine 74 and/or for establishing an electrical connecting line 94 for sensors and/or actuators 96 in the inner spaces 86 and/or 22.

In particular, the electrical lead-through is comprised by an electrical connecting unit 100 as is disclosed hereinafter for example in connection with the second exemplary embodiment.

The sensors and/or actuators can, for example, be temperature sensors 96 or logic elements which are arranged in the inner spaces 86 and/or 22.

As is illustrated in FIG. 1 and in FIG. 2 in an enlarged manner, the electrical lead-through 90 incorporates a mounting body 102 which comprises passages 104 through which contact elements 106 are passed and which for their part are enclosed by glass bodies 108 that are seated in the passages 104, whereby the glass bodies 108 fix the contact elements 106 relative to the mounting body 102 on the one hand and electrically insulate relative to the mounting body 102 on the other hand, so that for example, the electrical lines 92 and 94 can be fed out from the housing 12 by means of the contact elements 106 of the electrical lead-through 90.

Hereby, the electrical lead-through 90 is mounted in the housing 12 as a separate component and consequently has to be sealed relative to the housing 12 in order to prevent escape of the medium that is being supplied to the compressor/expander unit 10.

To this end, the mounting body 102 comprises a flange body 110 that surrounds in closed manner all the contact elements 106, and in particular too, all the passages 104 accommodating the contact elements 106, said flange body having a first mounting body sealing surface 112 which runs transverse to a compressive force D with which the pressurised medium that is arranged in the inner spaces 86 and/or 22 acts on the electrical lead-through 90, in particular on the mounting body 102 thereof, wherein the first mounting body sealing surface 112 is remote from the respective inner space 86 or 22 adjoining the electrical lead-through 90.

Consequently, the first mounting body sealing surface 112 faces a first housing sealing surface 114 which for its part, is arranged on a housing wall 116 and in particular, is formed such as to surround a passageway 118 for the contact elements 106 that is provided in the housing wall 116.

Furthermore, a sealing element 122 located between the first mounting body sealing surface 112 and the first housing sealing surface 114 is clamped between the first mounting body sealing surface 112 and the first housing sealing surface 114 and thus, on the one hand, seals both with respect to the mounting body sealing surface 112 and with respect to the first housing sealing surface 114, preferably over a large surface area, whereby in particular, the compressive force D that is being exerted by the medium arranged in the respective inner space 86 or 22 supports the sealing process between the first mounting body sealing surface 112, the first housing sealing surface 114 and the first sealing element 122 insofar as the mounting body 102 can move in the direction of the first housing sealing surface 114 to the extent to which the first sealing element 122 is seated.

This is thereby possible in that the mounting body 102 is held by holding elements 124, such as screws penetrating the housing wall 116 for example, in such a manner that the first mounting body sealing surface 112 and the first housing sealing surface 114 abut on the first sealing element 122 at least, and in particular clamp it therebetween, whereby in addition however, these holding elements 124 still permit a movement of the first mounting body sealing surface 112 of the mounting body 102 in the direction of the first housing sealing surface 114 so that, by means of the first mounting body sealing surface 112, the electrical lead-through acts on the first sealing element 122 in the manner of a piston due to the application of the compressive force D.

In order to also prevent leakage within the region of the first sealing element 122 in the event of low pressure and thus when the electrical lead-through 90 is being affected by means of a low compressive force D, in particular, in the event of a subsequently rising compressive force D or possibly, no or a negative compressive force D, the mounting body 102 is provided with a second mounting body sealing surface 132 which is arranged on a side of the first mounting body sealing surface 112 on the mounting body 102 facing the respective inner space 86 or 22 and cooperates with a second housing body sealing surface 134, whereby there is arranged between the second mounting body sealing surface 132 and the second housing sealing surface 134 a second sealing element 136 which abuts in sealing manner against the second mounting body sealing surface 132 on the one hand and on the second housing sealing surface 134 on the other hand.

Hereby, the second housing sealing surface 134 also abuts on a side of the first housing sealing surface 114 that faces the respective inner space 86 or 22.

Furthermore, the second mounting body sealing surface 132 and the second housing sealing surface 134 are arranged in such a way that they permit a movement of the mounting body 102 in the direction of the compressive force D in order not to disturb the previously described impingement of the first sealing element 122 by the first mounting body sealing surface 112.

Preferably the second mounting body sealing surface 132 and the second housing sealing surface 134 extend in parallel with each other.

Furthermore, the second sealing element 136 is preferably in the form of an O-ring whereby, for the purposes of securing the positioning of the second sealing element, the second mounting body sealing surface 132 forms a groove base of an accommodating groove 138 in which the second sealing element 136 in the form of an O-ring is accommodated.

Furthermore, the mounting body 102 is preferably also provided on one side or on both sides of the accommodating groove 138 with guide surfaces 142 with which the mounting body 102 is guided on the second housing sealing surface 134 which preferably extends laterally over the accommodating groove 138.

In one preferred solution, the second housing sealing surface 134 in the form of a cylindrical surface runs parallel to a guidance direction F in which the electrical lead-through 90 is movable by means of the compressive force D for application to the first sealing element 122.

Alternatively or in addition to the guidance of the mounting body 102 by the second housing sealing surface 134, the mounting body 102 is also guided by the passageway 118 provided in the housing wall 116, whereby a first receiving surface 152 of the mounting body 102 abuts on a second receiving surface 154 formed by the passageway 118 and wherein the receiving surfaces 152 and 154 preferably run parallel to the guidance direction F and thus transverse, preferably perpendicularly, to the first mounting body sealing surface 112 and the first housing sealing surface 114.

Insofar as the receiving surfaces 152 and 154 do not run rotationally-symmetrical with respect to the guidance direction F, they can serve for the purposes of fixing, in mutually non-rotatable manner, the feed-through from rotating about the guidance direction F as well as, by suitable shaping, fixing it in just one unambiguous position with respect to the guidance direction F.

Figure 3:
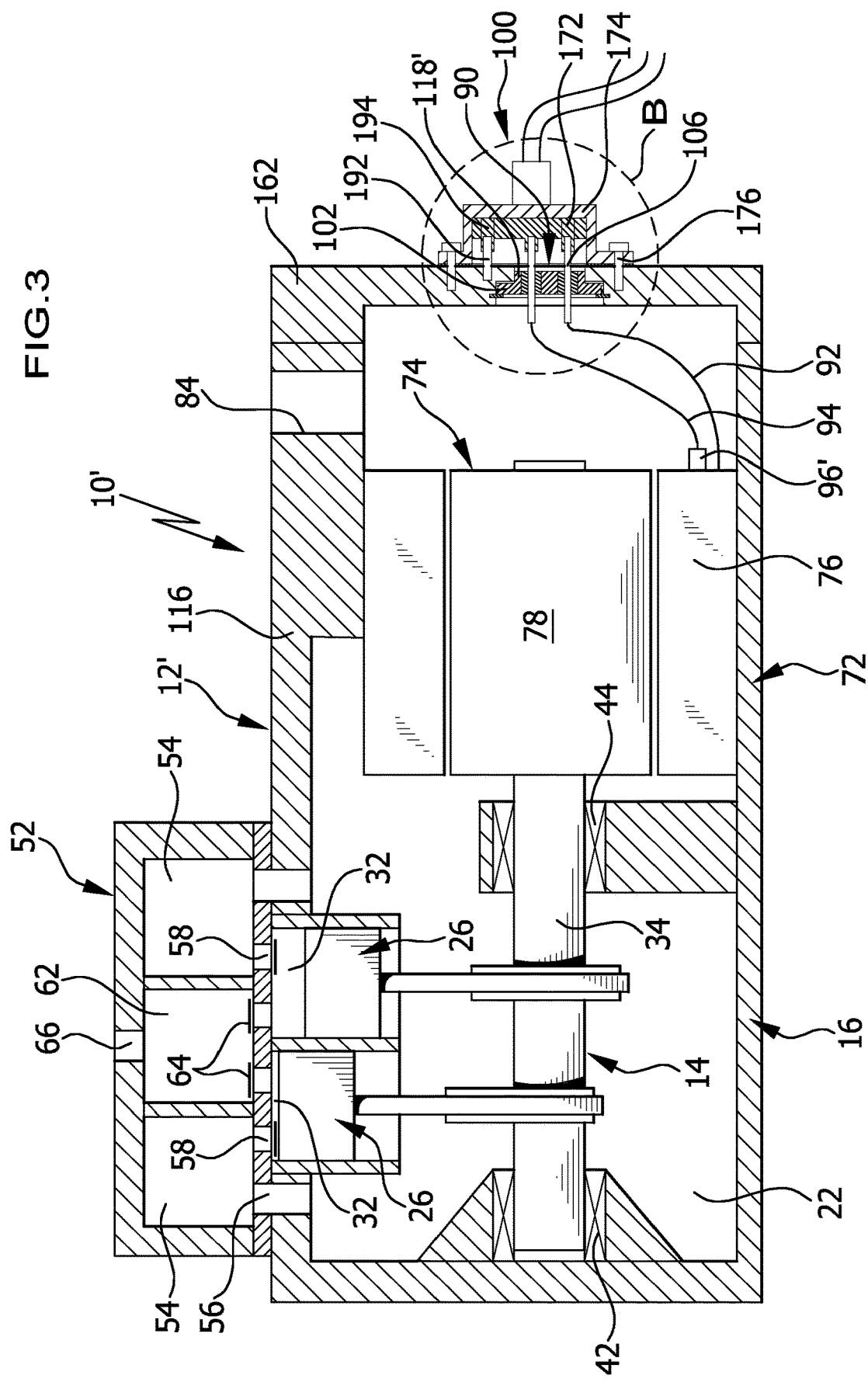
FIG. 3 a longitudinal section through a second exemplary embodiment of a compressor/expander unit in accordance with the invention and FIG. 4 an enlarged illustration of the region B in FIG. 3.

In a second exemplary embodiment of a compressor/expander machine 10' in accordance with the invention that is illustrated in FIG. 3, the housing feed-through 90 is not arranged in the lateral housing wall 116, but rather is seated in a passageway 118' which is arranged in an element, such as an end face housing cover 162 of the housing 12' for example, that is mountable on the housing 12' after the electrical machine 74 so that wiring up of the housing feed-through 90 to the electrical machine 74 that is already installed in the housing 12' can be effected.

Figure 4:
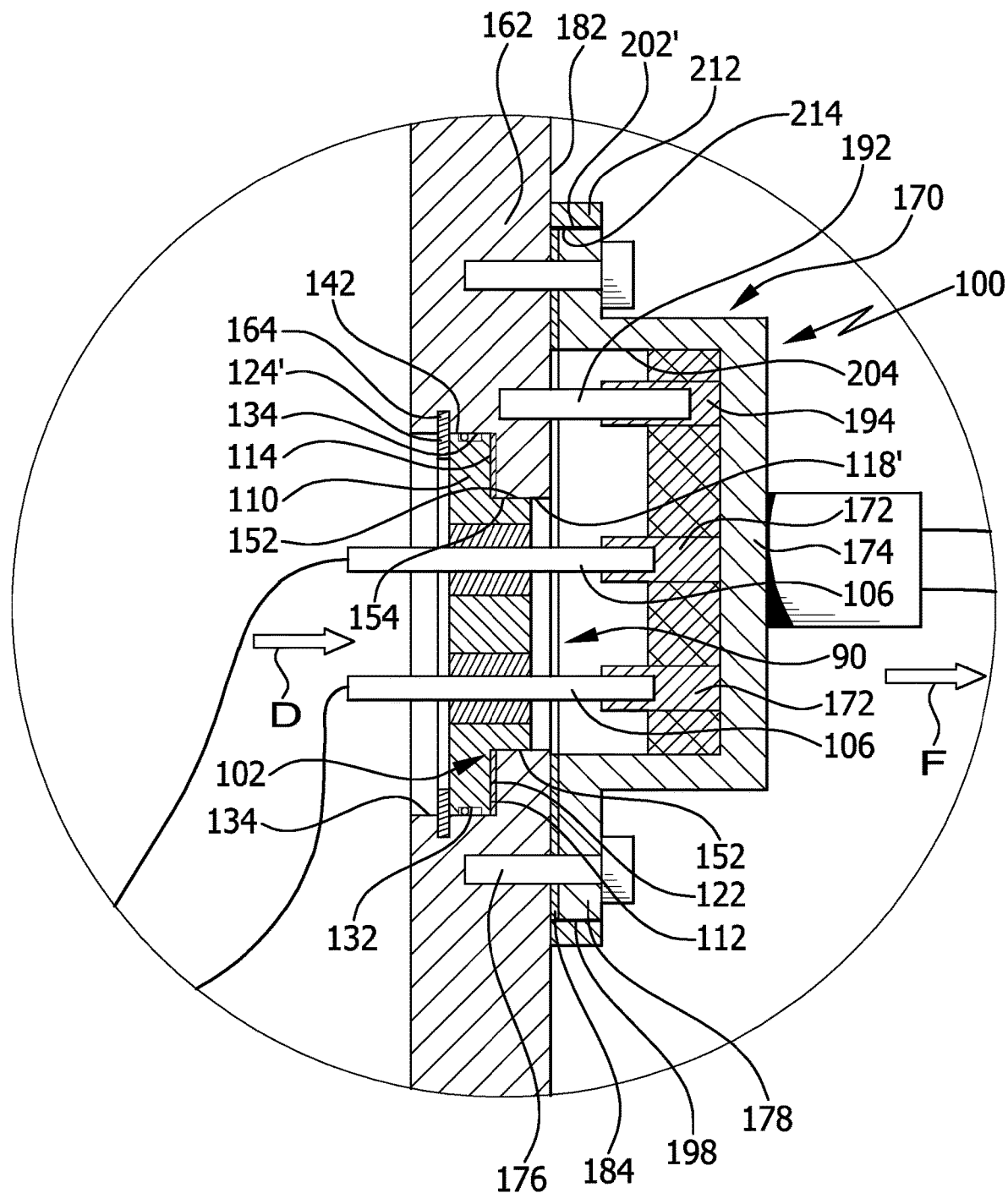

Hereby, as is illustrated in FIG. 4, the mounting body 102 together with the first mounting body sealing surface 112 and the second mounting body sealing surface 132 as well as the guide surface 142 are formed in the same way as was the case in the first exemplary embodiment and moreover, the passageway 118' in the housing cover 122 is configured in the same way as was the case in the first exemplary embodiment so that it comprises the first housing sealing surface 114 and the second housing sealing surface 134 as well as the guide surface 144 which are formed and are effective in like manner to the first exemplary embodiment.

Moreover, the contact elements 106 are also held on the mounting body 102 in the same way as was the case in the first exemplary embodiment.

In contrast to the first exemplary embodiment, there is provided a holding element 124' in the form of a retaining ring and in particular a snap ring which engages in an accommodating groove 164 worked into the second housing body sealing surface 134 and keeps the mounting body 102 positioned in such a manner that the first mounting body sealing surface 112 abuts against the first sealing element 122, but nevertheless without applying any significant amount of pressure thereto, whereby moreover, the first sealing element 122 abuts against the first housing sealing surface 114.

Due to the fact that the second mounting body sealing surface 132 and the second housing sealing surface 134 together with the second sealing element 136 that is arranged between them form a sealed closuree on the side which in this case faces the inner space 86, it is thereby ensured that the medium located in the inner space 86 still cannot escape therefrom in the region of the electrical lead-through 90 even in the event of a very low compressive force D or possibly even no or a negative compressive force D and moreover, it is ensured in the event of a rising compressive force D that the electrical lead-through 90 and in particular the mounting body 102 can move parallel to the guidance direction F and thus the first mounting body sealing surface 112 and the first housing sealing surface 114 impinge the first sealing element 122 with rising compressive force D in order to thereby ensure a reliable seal.

Furthermore, in the second exemplary embodiment, the electrical unit 96' is in the form of a sensor or logic element, for example, for the purposes of altering the coil circuitry.

In particular, the electrical lead-through 90 is part of an electrical connection 100 and cooperates, as is illustrated in FIG. 4, with a plug connector designated as a whole by 170 which comprises plug connector elements 172 that are connectable to the contact elements 106 and are arranged in a plug connector housing 174 and are connected to not illustrated connecting lines that are guided in the plug connector housing 174.

In the second exemplary embodiment, the plug connector housing 174 is fixed to the housing 12', in particular to the housing cover 162 with holding elements 176 for example—in the simplest case screws —, wherein the plug connector housing 174 preferably comprises a circumferential flange 178 which is placeable on an outer surface 182 of the housing 12' wherein, between the flange 178 and the outer surface 182 of the housing 12', there is provided yet another additional seal 184, preferably a gasket or a lip seal.

Hereby, the flange 178 and the seal 184 run around the passageway 118 radially-outwardly thereof.

Preferably, yet another earthing contact element 192 is provided near the passageway 118 and, for example, is held on the housing 12' preferably on the housing cover 162 and in particular is inserted into a boring thereof and is likewise contacted by a plug connector element 194 of the plug connector 170.

In order to initially establish an earthing contact between the earthing contact element 192 and the corresponding plug connector element 194 before an electrical connection to the contact elements 106 is established when placing the plug connector 170 on the contact elements 106 of the electrical lead-through 90 and the earthing contact element 192, the earthing contact element 192 is preferably formed in such a way that it projects above the outer surface of the housing 12' to a greater extent than the contact elements 106.

As an alternative however, for the purposes of contacting the earthing contact element 192, it is also conceivable for the plug connector element 194 to be constructed in such a way that it extends in the direction of the respective earthing contact element 192 further than the other plug connector elements 172 so that, likewise when plugging-in the plug connector 170, an earthing contact is thereby initially ensured before the contact elements 106 are contacted by the corresponding plug connector elements 172.

At the same time, an earthing contact formed in this manner has the advantage that it provides for an unambiguous orientation of the plug connector 170 relative to the contact elements 106 so that a unique connection between the respective contact element 106 and the corresponding plug connector element 172 is thereby established and so an improper connection due to twisted, twisted through 180° for example, placement of the plug connector 170 on the electrical lead-through 90 is prevented.

In addition, the unique aligned position of the plug connector housing 174 relative to the housing 12' with respect to a rotation about the guidance direction F' can be defined by suitable shaping of the plug connector housing 174, in particular the flange 178, for example, by an outer contour 202' or internal contour thereof, in cooperation with an alignment element 212 having correspondingly formed contours 214 that is arranged on the housing 12' and in particular on the housing cover 162.

In all other respects, all of the elements in the second exemplary embodiment which are identical with the first exemplary embodiment are provided with the same reference symbols so that in regard to the description thereof, reference should be made to the entirety of the explanations in respect of the first exemplary embodiment.

The invention claimed is:

1. Compressor/expander machine, comprising:
a housing in which there is arranged a compressor/expander unit for a medium that is guided in at least one inner space of the housing, and
an electrical connecting unit that is arranged on the housing, comprising at least one electrical lead-through that is arranged on the housing and leads into at least one inner space for establishing an electrical connection to at least one electrical unit that is arranged in the housing, the electrical lead-through comprising a mounting body that is mounted on the housing as a separate element as well as electrical contact elements that are seated therein, wherein the mounting body comprises a first mounting body sealing surface which is remote from the at least one inner space and surrounds the electrical contact elements in closed manner and which runs transverse to a compressive force that acts on the lead-through due to the medium under pressure in the at least one inner space and which cooperates in sealing manner with a first housing sealing surface of the housing that faces the at least one inner space as well as this first mounting body sealing surface, and wherein the mounting body is fixed to the housing by at least one holding element, which holds the mounting body in such a way that the first mounting body sealing surface is located in a sealing disposition relative to the first housing sealing surface.

2. The compressor/expander machine in accordance with claim 1, wherein the at least one holding element permits a movement of the first mounting body sealing surface in the direction of the first housing sealing surface.

3. The compressor/expander machine in accordance with claim 1, wherein the first mounting body sealing surface is arranged on a flange body of the mounting body surrounding the electrical contact elements.

4. The compressor/expander machine in accordance with claim 1, wherein a first sealing element is arranged, in particular clamped, between the first mounting body sealing surface and the first housing sealing surface.

5. The compressor/expander machine in accordance with claim 4, wherein both the first mounting body sealing surface and the first housing sealing surface each abut on the first sealing element in sealing manner.

6. The compressor/expander machine in accordance with claim 1, wherein the mounting body comprises a second mounting body sealing surface, which surrounds the whole of the electrical contact elements in closed manner and runs transverse to the first mounting body sealing surface, and in that the housing comprises a second housing sealing surface which runs transverse to the first housing sealing surface and cooperates with the second mounting body sealing surface in sealing manner.

7. The compressor/expander machine in accordance with claim 6, wherein the second mounting body sealing surface and the second housing sealing surface are arranged in cooperating manner on a side of the first mounting body sealing surface and the first housing sealing surface that faces the at least one inner space.

8. The compressor/expander machine in accordance with claim 6, wherein the second mounting body sealing surface and the second housing sealing surface are oriented in such a way that the first mounting body sealing surface of the mounting body is movable in the direction of the first housing sealing surface, in particular, with impingement of the first sealing element.

9. The compressor/expander machine in accordance with claim 6, wherein the first mounting body sealing surface and the second mounting body sealing surface run approximately transversely, preferably perpendicularly, relative to each other.

10. The compressor/expander machine in accordance with claim 6, wherein a second sealing element, in particular a sealing ring, is arranged between the second mounting body sealing surface and the second housing sealing surface.

11. The compressor/expander machine in accordance with claim 1, wherein the mounting body is provided with a first receiving surface which cooperates with a second receiving surface that is arranged on the housing.

12. The compressor/expander machine in accordance with claim 11, wherein the first receiving surface and the second receiving surface run in such a way that the first mounting body sealing surface of the mounting body is movable in the direction of the first housing sealing surface, in particular with impingement of the first sealing element.

13. The compressor/expander machine in accordance with claim 11, wherein the first and the second receiving surface run transverse to the first mounting body sealing surface and transverse to the first housing sealing surface.

14. The compressor/expander machine in accordance with claim 11, wherein the first receiving surface and the second receiving surface form a positive-locking arrangement which fixes the electrical lead-through relative to the housing in mutually non-rotatable manner.

15. The compressor/expander machine in accordance with claim 11, wherein the first receiving surface and the second receiving surface are arranged on a side of the first mounting body sealing surface and the first housing sealing surface that is remote from the at least one inner space.

16. The compressor/expander machine in accordance with claim 1, wherein the electrical lead-through is arranged on an element of the housing that is mountable on the housing, in particular, on an element of the housing that is mountable after the electrical machine.

17. The compressor/expander machine in accordance with claim 1, wherein the electrical lead-through is arranged on an element of the housing, in particular, on an element that is provided on the housing opposite the compressor/expander unit.

18. The compressor/expander machine in accordance with claim 17, wherein the mountable element is arranged on a housing section accommodating the electrical machine.

19. The compressor/expander machine in accordance with claim 1, wherein the electrical connecting unit comprises a plug connector that is connectable or connected to the electrical lead-through.

20. The compressor/expander machine in accordance with claim 19, wherein the plug connector comprises plug connector elements that are connectable to the contact elements of the electrical lead-through.

21. The compressor/expander machine in accordance with claim 19, wherein the plug connector comprises an earthing plug connector element which is connectable or connected to a housing-side earthing contact element.

22. The compressor/expander machine in accordance with claim 21, wherein the housing-side earthing contact element is arranged on the housing near the electrical lead-through.

23. The compressor/expander machine in accordance with claim 19, wherein the plug connector comprises a plug connector housing which is connectable or connected to the housing.

24. The compressor/expander machine in accordance with claim 23, wherein a seal is provided between the plug connector housing and the housing.

25. The compressor/expander machine in accordance with claim 23, wherein the plug connector housing comprises at least one first positively-locking surface which cooperates with a second positively-locking surface arranged on the housing for the purposes of positioning the plug connector housing relative to the housing.

26. The compressor/expander machine in accordance with claim 25, wherein the first positively-locking surface and the second positively-locking surface create a mutually non-twistable positively-locking connection.

27. The compressor/expander machine in accordance with claim 1, wherein an electrical machine that is mechanically coupled to the compressor expander unit is arranged in the housing as an electrical unit.

28. The compressor/expander machine in accordance with claim 1, wherein at least one electrical sensor is arranged in the housing as an electrical unit.

* * * * *